US012769578B2

(12) United States Patent
Yao et al.

(10) Patent No.: US 12,769,578 B2
(45) Date of Patent: Oct. 20, 2026

(54) METHOD FOR ACQUIRING IP ADDRESS OF HOST ON BASIS OF VIRTUALBOX, AND BACKGROUND SERVER

(71) Applicant: Guangdong Baolun Electronics Co., Ltd., Guangzhou (CN)

(72) Inventors: Chuanjun Yao, Guangzhou (CN); Hengkai Lian, Guangzhou (CN); De Ming, Guangzhou (CN)

(73) Assignee: GUANGDONG BAOLUN ELECTRONICS CO., LTD., Guangzhou (CN)

( * ) Notice: Subject to any disclaimer, the term of this patent is extended or adjusted under 35 U.S.C. 154(b) by 365 days.

(21) Appl. No.: 18/653,334

(22) Filed: May 2, 2024

(65) Prior Publication Data

US 2024/0281277 A1 Aug. 22, 2024

Related U.S. Application Data

(63) Continuation of application No. PCT/CN2022/117471, filed on Sep. 7, 2022.

(30) Foreign Application Priority Data

Apr. 7, 2022 (CN) ......................... 202210357703.4

(51) Int. Cl.

*G06F 9/455* (2018.01)
*G06F 8/61* (2018.01)

(52) U.S. Cl.

CPC ............ *G06F 9/45558* (2013.01); *G06F 8/61* (2013.01); *G06F 2009/45583* (2013.01); *G06F 2009/45595* (2013.01)

(58) Field of Classification Search

None

See application file for complete search history.

(56) References Cited

U.S. PATENT DOCUMENTS

2011/0153697 A1 6/2011 Nickolov et al.
2015/0117174 A1* 4/2015 Alber .................... G11B 17/00 369/53.41

(Continued)

FOREIGN PATENT DOCUMENTS

CN 107291525 A 10/2017
CN 109669763 A 4/2019

(Continued)

*Primary Examiner* — Bradley A Teets
*Assistant Examiner* — Melissa A Headly
(74) *Attorney, Agent, or Firm* — MUNCY, GEISSLER, OLDS & LOWE, P.C.

(57) ABSTRACT

A method for acquiring the IP address of a host on the basis of VirtualBox, and a background server, includes the following steps: S1, installing a subsystem into a host by means of VirtualBox; S2, setting a shared folder in VirtualBox in an auto-mount and fixed allocation manner, and storing a shared directory and a shared name in the host; S3, adding a BAT script into the host, acquiring IP configuration information of the host by means of the BAT script, and starting up the subsystem in VirtualBox; and S4, driving the subsystem to analyze the IP configuration information to acquire the IP address of the host. The IP address of a host is acquired by means of a BAT script, and is then shared to a subsystem for analysis, such that the IP address of the host is acquired by the subsystem.

8 Claims, 1 Drawing Sheet

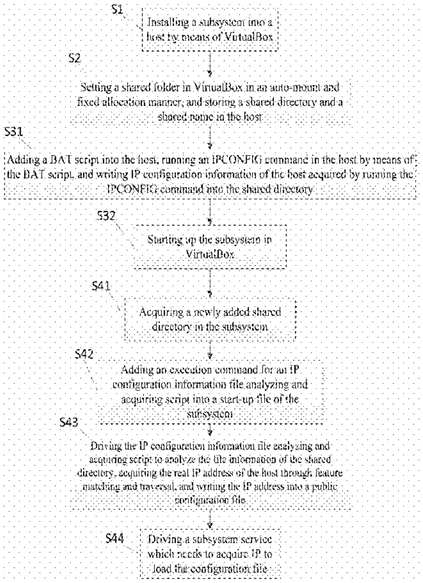

(56) References Cited

U.S. PATENT DOCUMENTS

| | | | | |
|---|---|---|---|---|
| 2015/0242204 | A1* | 8/2015 | Hassine | G06F 8/60 717/121 |
| 2017/0366580 | A1* | 12/2017 | Ylonen | G06F 21/575 |
| 2018/0203681 | A1* | 7/2018 | Acharya | G06F 9/45558 |

FOREIGN PATENT DOCUMENTS

| | | | |
|---|---|---|---|
| CN | 112887440 | A | 6/2021 |
| CN | 113824815 | A | 12/2021 |
| CN | 114035811 | A | 2/2022 |

* cited by examiner

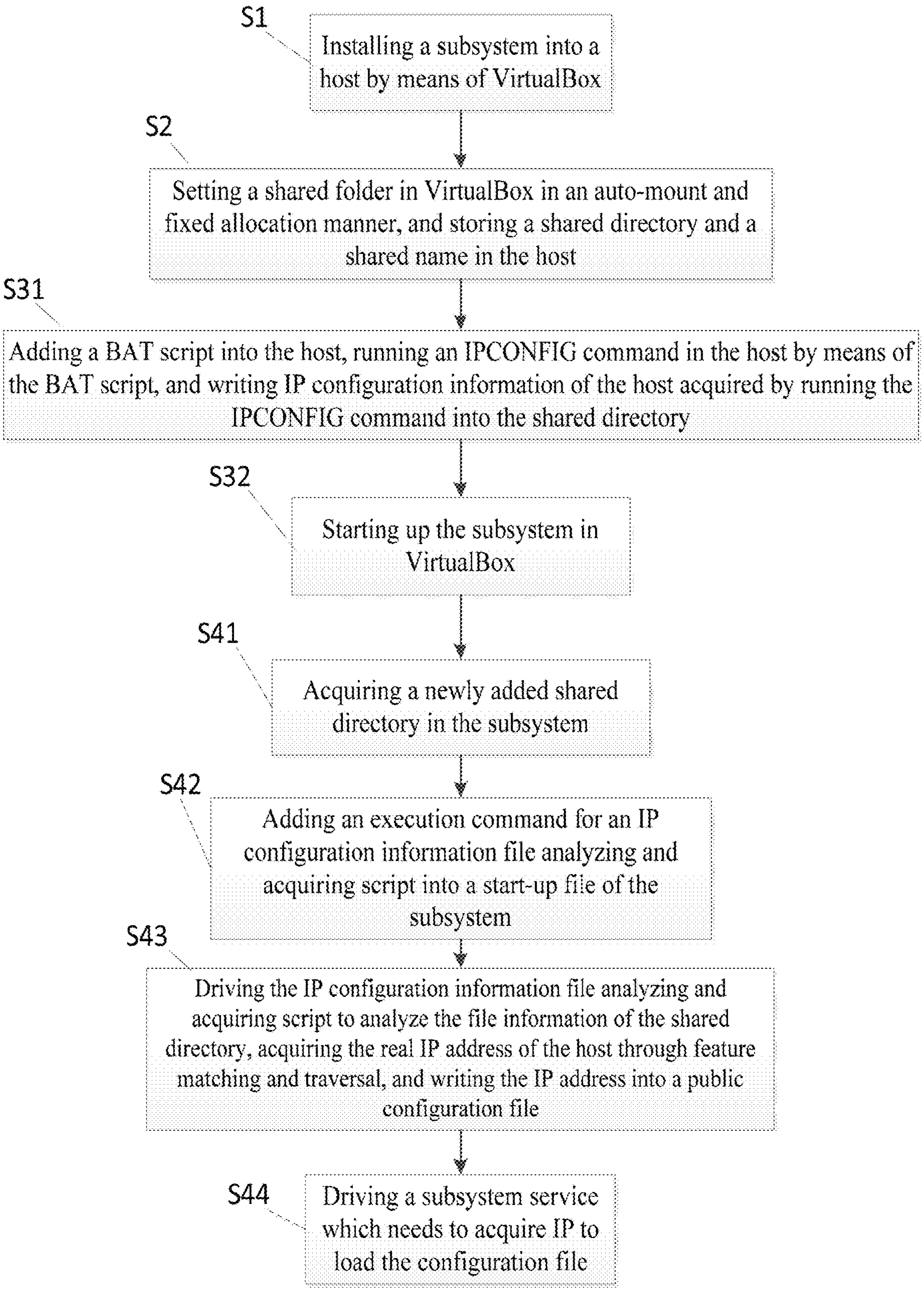
S1
Installing a subsystem into a host by means of VirtualBox
S2
Setting a shared folder in VirtualBox in an auto-mount and fixed allocation manner, and storing a shared directory and a shared name in the host
S31
Adding a BAT script into the host, running an IPCONFIG command in the host by means of the BAT script, and writing IP configuration information of the host acquired by running the IPCONFIG command into the shared directory
S32
Starting up the subsystem in VirtualBox
S41
Acquiring a newly added shared directory in the subsystem
S42
Adding an execution command for an IP configuration information file analyzing and acquiring script into a start-up file of the subsystem
S43
Driving the IP configuration information file analyzing and acquiring script to analyze the file information of the shared directory, acquiring the real IP address of the host through feature matching and traversal, and writing the IP address into a public configuration file
S44
Driving a subsystem service which needs to acquire IP to load the configuration file

METHOD FOR ACQUIRING IP ADDRESS OF HOST ON BASIS OF VIRTUALBOX, AND BACKGROUND SERVER

CROSS REFERENCE TO RELATED APPLICATIONS

This application is a Continuation of co-pending International Application No. PCT/CN2022/117471, filed on Sep. 7, 2022, for which priority is claimed under 35 U.S.C. § 120; and this application claims priority of Application No. 202210357703.4 filed in China on Apr. 7, 2022 under 35 U.S.C. § 119; the entire contents of all of which are hereby incorporated by reference.

TECHNICAL FIELD

The present application relates to the technical field of data sharing, and particularly relates to a method for acquiring the IP address of a host on the basis of VirtualBox, and a background server.

BACKGROUND

VirtualBox is an open-source virtual machine software developed by German Innotek and produced by Sun Microsystems, which is written in Qt, and is officially renamed Oracle VM VirtualBox after Sun Microsystems is acquired by Oracle. At present, VirtualBox is known as the strongest free virtual machine software based on rich features and friendly performance. In fact, operating systems which can be virtualized by VirtualBox includes Windows (all Windows systems from Windows 3.1 to Windows 10 and Windows Server 2012), Mac OS X, Linux, OpenBSD, Solaris, IBM OS2 and even Android, and users can install and run the above operating systems in VirtualBox.

Therefore, VirtualBox does bring convenience, efficiency and stability to deploying LINUX in WINDOWS. However, to ensure external access consistency between a host and a subsystem, network connection is directly set to NAT mode. In this mode, the users will find that it is very difficult for a subsystem service to acquire the IP address of the host dynamically, and no ready-made solution is available at present. Once the IP address of the host needs to be adjusted or changed, the virtual subsystem needs to be modified and restarted manually whenever a host service is needed, which brings obviously poor experience to the users.

SUMMARY

To overcome the defects in the prior art, one purpose of the present application is to provide a method for acquiring the IP address of a host on the basis of VirtualBox, which can solve the problem that a user needs to restart a host repeatedly because the IP address of the host cannot be acquired dynamically.

Another purpose of the present application is to provide a background server for acquiring the IP address of a host on the basis of VirtualBox, which can solve the problem that a user needs to restart a host repeatedly because the IP address of the host cannot be acquired dynamically.

To achieve the one of the above purposes, the present application adopts the following technical solution:

A method for acquiring the IP address of a host on the basis of VirtualBox, comprising the following steps:

S1: Installing a subsystem into a host by means of VirtualBox;

S2: Setting a shared folder in VirtualBox in an auto-mount and fixed allocation manner, and storing a shared directory and a shared name in the host;

S3: Adding a BAT script into the host, acquiring IP configuration information of the host by means of the BAT script, and starting up the subsystem in VirtualBox; and

S4: Driving the subsystem to analyze the IP configuration information to acquire the IP address of the host, and updating the IP configuration information of the subsystem.

Preferably, the following step is also included between S1 and S2:

Setting the network connection of the host to NAT mode.

Preferably, the storage location of the BAT script is the self-starting menu bar of the host.

Preferably, the step S3 is specifically implemented by the following steps:

S31: Adding a BAT script into the host, running an IPCONFIG command in the host by means of the BAT script, and writing IP configuration information of the host acquired by running the IPCONFIG command into the shared directory; and

S32: Starting up the subsystem in VirtualBox.

Preferably, the step S4 is specifically implemented by the following steps:

S41: Acquiring a newly added shared directory in the subsystem;

S42: Adding an execution command for an IP configuration information file analyzing and acquiring script into a start-up file of the subsystem;

S43: Driving the IP configuration information file analyzing and acquiring script to analyze the file information of the shared directory, acquiring the real IP address of the host through feature matching and traversal, and writing the IP address into a public configuration file; and

S44: Driving a subsystem service which needs to acquire IP to load the configuration file.

Preferably, the subsystem is LINUX.

To achieve the other of the above purposes, the present application adopts the following technical solution:

A background server for acquiring the IP address of a host on the basis of VirtualBox, comprising a memory and a processor;

The memory is used for storing program instructions;

The processor is used for running the program instructions, so as to implement the method for acquiring the IP address of a host on the basis of VirtualBox.

Compared with the prior art, the present application has the following beneficial effects: by presetting a shared directory, acquiring the IP address of a host by means of a BAT script, sharing the IP address to the shared directory, automatically starting and driving a subsystem to analyze the IP configuration information to acquire the IP address of the host by the subsystem, and automatically updating the IP configuration information of the subsystem, the host and the subsystem can share the same IP address without manually configuring the IP configuration information of the subsystem.

DESCRIPTION OF DRAWINGS

The FIGURE is a flow chart of a method for acquiring the IP address of a host on the basis of VirtualBox of the present application.

DETAILED DESCRIPTION

Preferred embodiments of the present application will be explained below in detail in combination with drawings. It should be understood that the preferred embodiments described below are only used for describing and explaining the present application, but are not used for limiting the present application.

It should be noted in the description of the present application that terms such as "central", "upper", "lower", "left", "right", "vertical", "horizontal", "inner", "outer", etc. indicate direction or position relationships shown based on the drawings, and are only intended to facilitate the description of the present application and the simplification of the description rather than to indicate or imply that the indicated device or element must have a specific direction or constructed and operated in a specific direction, and therefore, shall not be understood as a limitation to the present application. In addition, the terms such as "first", "second" and "third" are only used for the purpose of description, rather than being understood to indicate or imply relative importance.

It should be noted in the explanation of the present application that, unless otherwise specifically regulated and defined, terms such as "installation," "connected," and "connecting" shall be understood in broad sense, and for example, may refer to fixed connection or detachable connection or integral connection, may refer to mechanical connection or electrical connection, and may refer to direct connection or indirect connection through an intermediate medium or inner communication of two elements. For those ordinary skilled in the art, the specific meanings of the above terms in the present application may be understood according to specific conditions.

The present application is further described below in combination with drawings and specific embodiments.

In the present application, the operating system of the host can be a Windows series system, and is preferably Windows2008 system; the subsystem can be an operating system such as Windows (all Windows systems from Windows 3.1 to Windows 10 and Windows Server 2012), Mac OS X, Linux, OpenBSD, Solaris, IBM OS2 and even Android, and is preferably LINUX.

Embodiment 1

As shown in the FIGURE, a method for acquiring the IP address of a host on the basis of VirtualBox, comprising the following steps:

S1: Installing a subsystem into a host by means of VirtualBox;

In the embodiment, the operating system of the host is Windows2008 system, VirtualBox is installed in the host in advance, then a LINUX subsystem of Debian9 release version is installed in VirtualBox, and the network connection of the host is set to NAT mode.

S2: Setting a shared folder in VirtualBox in an auto-mount and fixed allocation manner, and storing a shared directory and a shared name in the host;

Specifically, folder sharing is set in VirtualBox in an auto-mount and fixed allocation manner, a shared directory and a shared name in the host are stored, and it is assumed that the shared directory is "d:\soft\share" and the shared name is "share".

S3: Adding a BAT script into the host, acquiring IP configuration information of the host by means of the BAT script, and starting up the subsystem in VirtualBox;

Specifically, a BAT script that automatically acquires IP configuration information in the host and writes the IP configuration information into a file of the shared directory to provide an analysis file source for an analysis script after subsystem start-up is added; in the embodiment, the step S3 is specifically implemented by the following steps:

S31: Adding a BAT script into the host, running an IPCONFIG command in the host by means of the BAT script, and writing IP configuration information of the host acquired by running the IPCONFIG command into the shared directory; and Preferably, the storage location of the BAT script is the self-starting menu bar of the host, so that the IPCONFIG command is run in the host by means of the BAT script after the command is opened in Windows of the host, and the complete IP configuration information of the host is written into a file of the shared directory to provide an analysis file source for an analysis script after subsystem start-up.

S32: Starting up the subsystem in VirtualBox.

Specifically, the subsystem in VirtualBox is started up after the IP configuration information is shared by the BAT script; preferably, the BAT script includes the following instructions:

```
cd C:\Program Files\Oracle\VirtualBox
VBoxManage.exe startvm debian9—type headless.
```

S4: Driving the subsystem to analyze the IP configuration information to acquire the IP address of the host, and updating the IP configuration information of the subsystem.

Specifically, a shared file is analyzed after being acquired by the subsystem to acquire the IP configuration information; in the embodiment, the step S4 is specifically implemented by the following steps:

S41: Acquiring a newly added shared directory in the subsystem;

Specifically, after the subsystem is started up, a virtual file disk will be automatically created by VirtualBox due to a built-in mechanism of VirtualBox, and as auto-mount is set in step S2, a newly added shared directory in the subsystem, for example, a "/media/sf share" directory (where "share" is the shared name in step S2), is easy to search.

S42: Adding an execution command for an IP configuration information file analyzing and acquiring script into a start-up file of the subsystem;

Specifically, an execution command for an IP configuration information file analyzing and acquiring script is added into a start-up file, for example, "/etc/rc.local"; when the IP configuration information file analyzing and acquiring script is in "/data/www/get_ip.php", "php/data/www/get_ip.php" is written into "/etc/rc.local", so that the subsystem immediately enters IP analysis logic after getting ready for start-up to provide an IP configuration source for subsequent application service start-up of the subsystem.

S43: Driving the IP configuration information file analyzing and acquiring script to analyze the file information of the shared directory, acquiring the real IP address of the host through feature matching and traversal, and writing the IP address into a public configuration file; and Specifically, first, original output information of the IPCONFIG command is converted from GB2312 to UTF-8, then carriage returns and line breaks are removed, and finally, the information is converted into an array; the array in step S3 is traversed to judge the name of each NIC and exclude a local loopback address, a local virtual NIC, and an IPV6 NIC, so that the remaining NIC information containing IPV4 NIC keywords is a specifically analyzed IP information string; the specific IPV4 address, i.e., the real IP address of the host, can be acquired through analysis by comprehensively using a string correlation function, then the IP address is written into a public configuration file "ip.php", and the purpose is achieved

S44: Driving a subsystem service which needs to acquire IP to load the configuration file.

Specifically, all services of a business system of the subsystem are started up, and a file "/data/www/ip.php" is uniformly loaded by the services which need to acquire IP.

Embodiment 2

A background server for acquiring the IP address of a host on the basis of VirtualBox, comprising a memory and a processor;

The memory is used for storing program instructions;

The processor is used for running the program instructions, so as to implement the method for acquiring the IP address of a host on the basis of VirtualBox according to embodiment 1.

For those skilled in the art, various other corresponding changes and modifications can be made according to the technical solution and concept described above, and all these changes and modifications should fall within the protection scope of the claims of the present application.

What is claimed is:

1. A method for acquiring an IP address of a host on the basis of VirtualBox, comprising the following steps:

A: installing a subsystem into a host by means of VirtualBox, the subsystem comprising one or more services that are required to obtain the IP address of the host;

B: setting a shared folder in VirtualBox in an auto-mount and fixed allocation manner, and storing a shared directory and a shared name in the host;

C: adding a BAT script into the host, acquiring IP configuration information of the host by means of the BAT script, and starting up the subsystem in VirtualBox; and D: driving the subsystem to analyze the IP configuration information to acquire the IP address of the host, and updating the IP configuration information of the subsystem;

the step C is specifically implemented by the following steps:

C1: adding a BAT script into the host, running an IPCONFIG command in the host by means of the BAT script, and writing IP configuration information of the host acquired by running the IPCONFIG command into the shared directory; and C2: starting up the subsystem in VirtualBox;

the step D is specifically implemented by the following steps:

D1: acquiring a newly added shared directory in the subsystem;

D2: adding an execution command for an IP configuration information file analyzing and acquiring script into a start-up file of the subsystem;

D3: driving the IP configuration information file analyzing and acquiring script to analyze the file information of the shared directory, acquiring the real IP address of the host through feature matching and traversal of information associated with each network interface card of the host, and writing the IP address of the host into a public configuration file; and D4: driving a subsystem service of the one or more services which needs to acquire the IP address of the host to load the public configuration file.

2. The method for acquiring the IP address of a host on the basis of VirtualBox according to claim 1, wherein the following step is also included between S1 and S2: setting the network connection of the host to NAT mode.

3. The method for acquiring the IP address of a host on the basis of VirtualBox according to claim 1, wherein the storage location of the BAT script is the self-starting menu bar of the host.

4. The method for acquiring the IP address of a host on the basis of VirtualBox according to claim 1, wherein the subsystem is LINUX.

5. A background server for acquiring the IP address of a host on the basis of VirtualBox, comprising a memory and a processor;

the memory is used for storing program instructions;

the processor is used for running the program instructions, so as to implement the method for acquiring the IP address of a host on the basis of VirtualBox according to claim 1.

6. A background server for acquiring the IP address of a host on the basis of VirtualBox, comprising a memory and a processor;

the memory is used for storing program instructions;

the processor is used for running the program instructions, so as to implement the method for acquiring the IP address of a host on the basis of VirtualBox according to claim 2.

7. A background server for acquiring the IP address of a host on the basis of VirtualBox, comprising a memory and a processor;

the memory is used for storing program instructions;

the processor is used for running the program instructions, so as to implement the method for acquiring the IP address of a host on the basis of VirtualBox according to claim 3.

8. A background server for acquiring the IP address of a host on the basis of VirtualBox, comprising a memory and a processor;

the memory is used for storing program instructions;

the processor is used for running the program instructions, so as to implement the method for acquiring the IP address of a host on the basis of VirtualBox according to claim 4.

* * * * *